(12) United States Patent
Platzer et al.

(10) Patent No.: US 11,658,571 B2
(45) Date of Patent: May 23, 2023

(54) LOW POWER REGULATOR CIRCUIT

(71) Applicant: Analog Devices International Unlimited Company, Limerick (IE)

(72) Inventors: Wilfried Platzer, Ettenheim (DE); Matthias Holzinger, Vorstetten (DE)

(73) Assignee: Analog Devices International Unlimited Company, Limerick (IE)

( * ) Notice: Subject to any disclaimer, the term of this patent is extended or adjusted under 35 U.S.C. 154(b) by 226 days.

(21) Appl. No.: 16/837,691

(22) Filed: Apr. 1, 2020

(65) Prior Publication Data
US 2021/0313884 A1  Oct. 7, 2021

(51) Int. Cl.
*H02M 3/158* (2006.01)
*H02M 1/00* (2006.01)

(52) U.S. Cl.
CPC ............. *H02M 3/158* (2013.01); *H02M 1/00* (2013.01); *H02M 1/0032* (2021.05)

(58) Field of Classification Search
CPC ....... H02M 3/158; H02M 1/00; H02M 1/0032
See application file for complete search history.

(56) References Cited

U.S. PATENT DOCUMENTS

| | | |
|---|---|---|
| 5,994,882 A | 11/1999 | Ma |
| 7,478,254 B2 | 1/2009 | Kawai |
| 8,010,819 B2 | 8/2011 | Pastorello et al. |
| 8,601,302 B2 | 12/2013 | Lachwani et al. |
| 8,707,066 B2 | 4/2014 | Allarey et al. |
| 8,830,073 B2 | 9/2014 | Sims et al. |
| 8,867,245 B1 | 10/2014 | Hwang |
| 9,360,928 B2 | 6/2016 | Pedersen et al. |
| 9,395,797 B2 | 7/2016 | Sharda et al. |
| 9,537,407 B2 | 1/2017 | Fang et al. |

(Continued)

FOREIGN PATENT DOCUMENTS

| | | |
|---|---|---|
| CN | 115428317 | 12/2022 |
| EP | 1341380 A1 | 9/2003 |

(Continued)

OTHER PUBLICATIONS

Martin, Kevin, et al., "Implementing Low Power Consumption in Standby Mode in the Case of Power Supplies with Power Factor Correction", IEEE Applied Power Electronics Conference and Exposition (APEC), (2017), 7 pgs.

(Continued)

*Primary Examiner* — Rafael O De Leon Domenech
(74) *Attorney, Agent, or Firm* — Schwegman Lundberg & Woessner, P.A.

(57) ABSTRACT

Techniques are described that can solve the problem of being low power while running a device on battery and alternatively running on the output of a switching regulator. In a low power mode, a voltage regulator circuit can be powered down and a switch can connect an input voltage of the regulator, e.g., a battery, to the CPU. In addition, internal and/or external loads, such as voltage feedback resistors, can be disconnected in order to further reduce the power consumption. If the device is going into operation, the CPU can be disconnected from the input voltage of the regulator, e.g., the battery, and switched to the output of the regulator. This can ensure that the circuit consumes very little power consumption in standby mode.

19 Claims, 5 Drawing Sheets

(56) References Cited

U.S. PATENT DOCUMENTS

| | | | |
|---|---|---|---|
| 9,602,018 B2 | 3/2017 | Herfurth | |
| 9,705,408 B2 | 7/2017 | Quigley | |
| 9,859,793 B2* | 1/2018 | Ihs | G05F 1/10 |
| 9,912,243 B2 | 3/2018 | Quigley | |
| 9,977,445 B2 | 5/2018 | Cui | |
| 2012/0081086 A1 | 4/2012 | Van et al. | |
| 2013/0249520 A1 | 9/2013 | Oikarinen et al. | |
| 2014/0347078 A1* | 11/2014 | Qin | G01R 19/0092 324/713 |
| 2015/0042300 A1* | 2/2015 | Peker | H02M 3/1588 323/274 |
| 2016/0049860 A1* | 2/2016 | Ihs | H02M 3/1588 323/282 |
| 2017/0040898 A1* | 2/2017 | Hong | H02M 3/1582 |
| 2018/0294730 A1 | 10/2018 | Lin et al. | |

FOREIGN PATENT DOCUMENTS

| | | |
|---|---|---|
| KR | 20150066958 | 6/2015 |
| WO | WO-2010084444 A2 | 7/2010 |
| WO | WO-2018000517 A1 | 1/2018 |
| WO | 2021198459 | 10/2021 |

OTHER PUBLICATIONS

"International Application Serial No. PCT/EP2021/058690, International Search Report dated Jun. 18, 2021", 4 pgs.

"International Application Serial No. PCT/EP2021/058690, Written Opinion dated Jun. 18, 2021", 5 pgs.

"International Application Serial No. PCT/EP2021/058690, International Preliminary Report on Patentability dated Oct. 13, 2022", 7 pgs.

"European Application Serial No. 21716715.4, Response to Communication pursuant to Rules 161 and 162 filed Feb. 22, 2023", 16 pgs.

"Chinese Application Serial No. 202180025693.8 Voluntary Amendment filed Mar. 8, 2023", w/ English Claims, 10 pgs.

* cited by examiner

LOW POWER REGULATOR CIRCUIT

FIELD OF THE DISCLOSURE

This document pertains generally to power supply devices and more particularly to voltage regulators.

BACKGROUND

One of the most common challenges in designing portable electronic devices is the generation and maintenance of a regulated voltage from an unregulated voltage source, such as a battery. Typically, a voltage regulator is used for this purpose. A voltage regulator may be designed as a linear regulator or a switching regulator.

A linear regulator provides closed loop control to regulate the voltage at the load. This type of regulator may be used to provide a constant output voltage that has a lower magnitude than the unregulated voltage source.

In contrast, a switching regulator uses an energy-storage element, such as an inductor, to transfer energy from the unregulated power source to the load in discrete bursts. Feedback circuitry may be used to regulate the energy transfer to maintain a constant voltage at the load. Because the switching regulator operates to transfer energy in discrete bursts, it can be configured to step-up and/or step-down the voltage of the unregulated voltage source. Moreover, switching regulators are generally more efficient than linear regulators.

Various types of switching regulators are commonly used today in portable electronic devices. A buck converter is an inductor-based regulator used to step-down or buck the unregulated voltage source. A boost converter is an inductor-based regulator used to step-up or boost the unregulated voltage source. In some applications, various converters may be used to provide a regulated output that is higher, lower or the same as the unregulated voltage source.

SUMMARY OF THE DISCLOSURE

This disclosure describes, among other things, techniques that can solve the problem of being low power while running a device on battery and alternatively running on the output of the switching regulator. In a low power mode, a voltage regulator circuit can be powered down and a switch can connect an input voltage of the regulator, e.g., a battery, to the CPU. In addition, internal and/or external loads, such as voltage feedback resistors, can be disconnected in order to further reduce the power consumption. If the device is going into operation, the CPU can be disconnected from the input voltage of the regulator, e.g., the battery, and switched to the output of the regulator. This can ensure that the circuit consumes very little power consumption in standby mode.

In some aspects, this disclosure is directed to a voltage regulator circuit configured to receive an input voltage and generate a first output voltage, the voltage regulator circuit having a shutdown enabled mode, the voltage regulator circuit comprising: a regulator control circuit configured to control a plurality of switches to generate the first output voltage at a first output node, wherein, during the shutdown enabled mode, the regulator control circuit is configured to stop generating the first output voltage and couple the input voltage to a second output node and provide a second output voltage different from the first output voltage to the second output node.

In some aspects, this disclosure is directed to a method of operating a voltage regulator circuit having a shutdown enabled mode and including a plurality of switches, the method comprising: receive an input voltage and control a plurality of switches to generate a first output voltage at a first output node; during a shutdown enabled mode, stopping the generation of the first output voltage; and coupling the input voltage to a second output node and providing a second output voltage different from the first output voltage to the second output node.

In some aspects, this disclosure is directed to a voltage regulator circuit configured to receive an input voltage and generate a first output voltage, the voltage regulator circuit having a shutdown enabled mode, the voltage regulator circuit comprising: means for controlling a plurality of switches to generate a first output voltage at a first output node; during a shutdown enabled mode, means for stopping the generation of the first output voltage; and means for coupling the input voltage to a second output node and means for providing a second output voltage different from the first output voltage to the second output node.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In battery applications with switching regulators, such as boost converters and buck-boost converters, a system central processing unit (CPU) can be powered by a battery when the regulator is OFF and by a regulator output when the regulator is running. The present inventors have recognized that even when the regulator is OFF, internal and/or external loads, such as voltage feedback resistors, can result in power loss due to the current flowing through the feedback resistors.

This disclosure describes techniques that can solve the problem of being low power while running a device on battery and alternatively running on the output of the switching regulator. The present inventors have recognized that, among other things, in a low power mode, the voltage regulator circuit can be powered down and a switch can connect an input voltage of the regulator, e.g., a battery, to the CPU. In addition, internal and/or external loads, such as voltage feedback resistors, can be disconnected in order to further reduce the power consumption. If the device is going into operation, the CPU can be disconnected from the input voltage of the regulator, e.g., the battery, and switched to the output of the regulator. This can ensure that the circuit consumes very little power consumption in standby mode.

Figure 1:
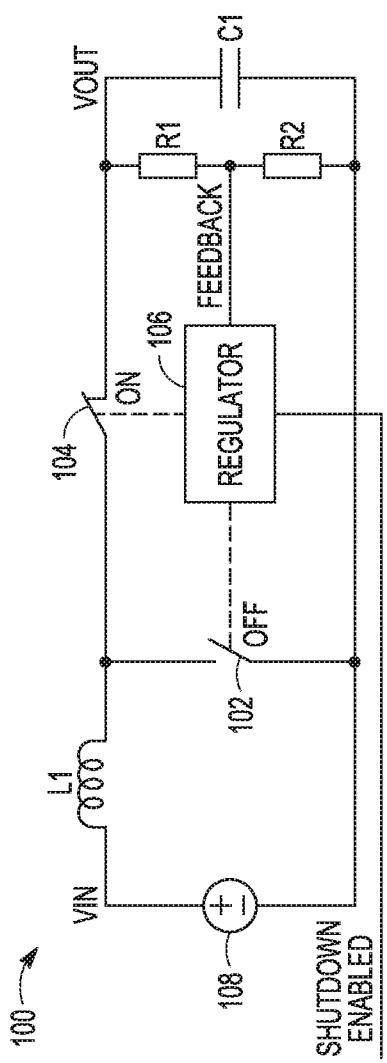
FIG. 1 is an example of a voltage regulator circuit.

FIG. 1 is an example of a voltage regulator circuit 100. The voltage regulator circuit 100 of FIG. 1 can include first and second electronic switches 102, 104 that are each coupled to and controlled by a regulator control circuit 106. The first and second switches 102, 104 can be transistors, such as field-effect transistors (FET), for example. In some examples, the switch 104 can be implemented as a diode, e.g., a diode-connected FET.

An inductor L1 can be coupled to an input voltage VIN, such as provided by a voltage source 108, such as a battery, and to a capacitor C1 via the first electronic switch 104. The regulator control circuit 106 can control the switches 102, 104 to turn ON and OFF to control the alternating charging of the inductor L1 and the capacitor C1. A load (not depicted) can be coupled in parallel with the capacitor C1 and supplied with an output voltage VOUT.

To save power, for example, the regulator control circuit 106 can be placed in a shutdown mode. For example, a control circuit can provide a "shutdown enabled" signal to the regulator control circuit 106 to place the regulator control circuit 106 in the shutdown mode. In the shutdown mode, the switch 102 can be OFF and the switch 104 can be ON. In the shutdown mode, an output voltage VOUT can still be provided by the voltage source 108, such as a battery.

As seen in FIG. 1, the voltage regulator circuit 100 can include two resistors R1, R2 that provide a feedback path to the regulator control circuit 106 so as to allow it to monitor a representation of the output voltage VOUT. In the shutdown mode, however, current can still flow through the feedback path, which can result in power loss. In addition, there can be current consumption through an output load and through biasing of the regulator control circuit 106.

Figure 2:
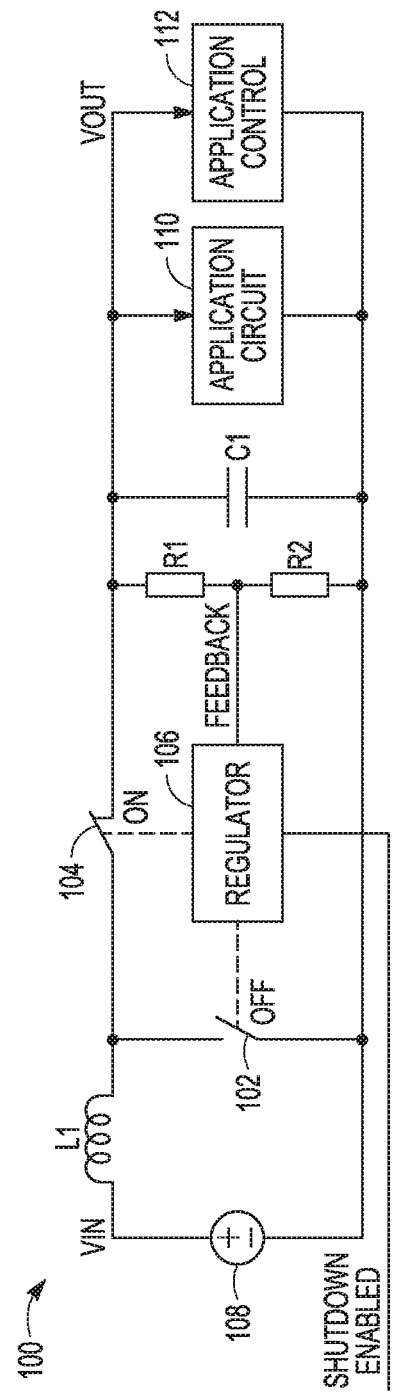
FIG. 2 is the voltage regulator circuit of FIG. 1 coupled to a load.

FIG. 2 is the voltage regulator circuit 100 of FIG. 1 coupled to a load. The voltage regulator circuit 100 can include some components that are similar to those of FIG. 1. Similar reference numbers are used for similar components and, for purposes of conciseness, will be not be described again.

The circuit 100 of FIG. 2 depicts a load including an application control circuit 110 and an application circuit 112. In a non-limiting example, the application control circuit 110, e.g., a microcontroller, and the application circuit 112 can form part of a drug delivery device, such as a drug delivery pump. The application control circuit 110 can be positioned in the drug delivery device, for example, and can turn the drug delivery device ON and OFF.

During the shutdown mode, an output voltage VOUT can still be provided by the voltage source 108, such as a battery. In the shutdown mode, the application control circuit 110 can draw a low power control current and the application circuit 112, e.g., a drug delivery device, can draw an application standby current.

Figure 3:
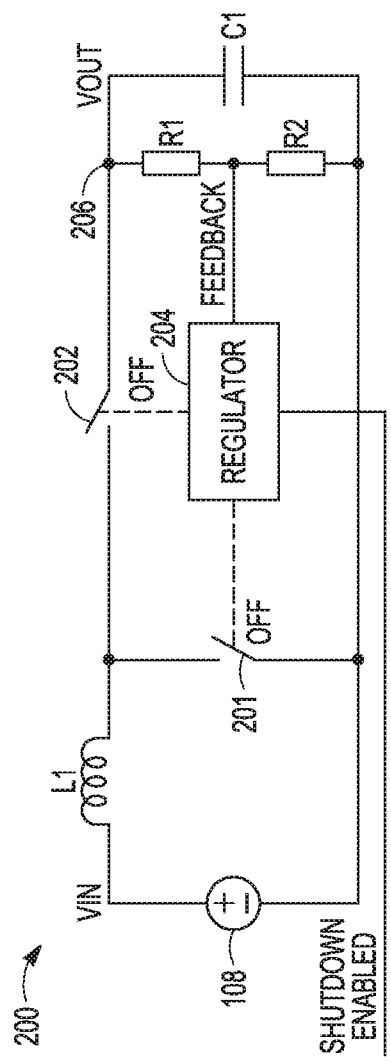
FIG. 3 is an example of a voltage regulator circuit including an output isolation switch.

FIG. 3 is an example of a voltage regulator circuit 200 including an output isolation switch. The voltage regulator circuit 200 can include some components that are similar to those of FIGS. 1-2. The voltage regulator circuit 200 can include a switch 201 and an isolation switch 202 that, during a shutdown mode, the regulator control circuit 204 can disconnect the output node 206 from the input voltage VIN. In the shutdown mode, there is very low power consumption, but unlike the configurations shown in FIGS. 1 and 2, there is no output voltage available to power connected loads. A configuration such as shown in FIG. 3 can be undesirable for medical applications, for example.

Figure 4:
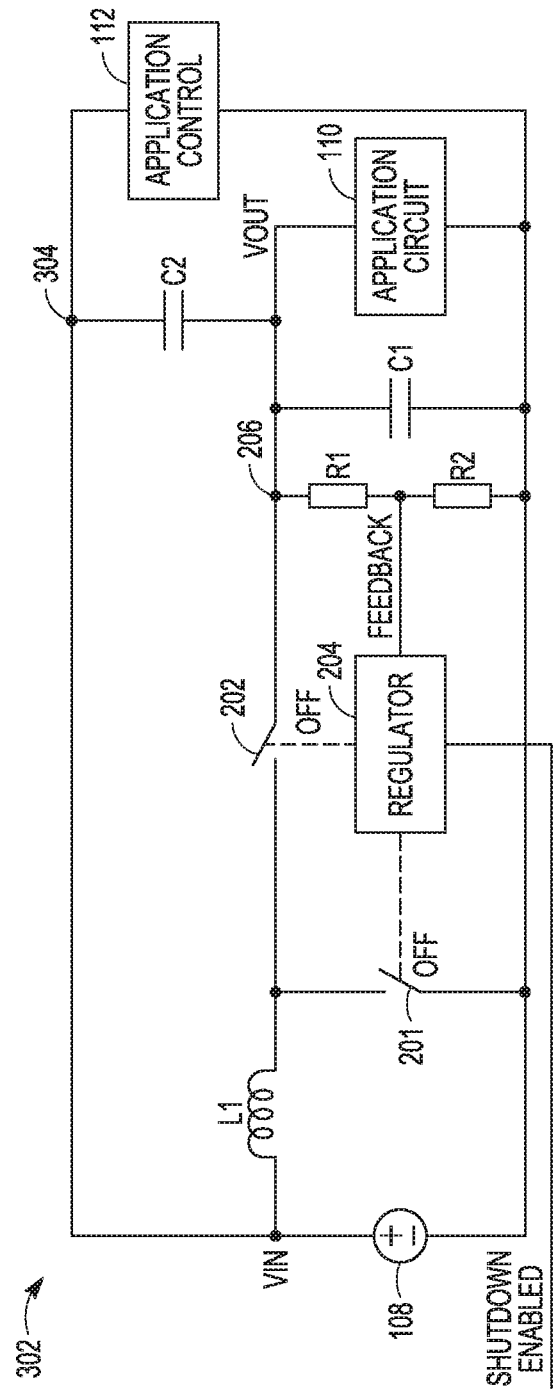
FIG. 4 is an example of a voltage regulator circuit with an isolation switch coupled to a load.

FIG. 4 is an example of a voltage regulator circuit 300 with an isolation switch coupled to a load. The voltage regulator circuit 300 can include some components that are similar to those of FIGS. 1-3. The circuit 300 of FIG. 4 depicts a load including an application control circuit 110 and an application circuit 112. The voltage regulator circuit 300 can include a switch 201 and an isolation switch 202 that, during a shutdown mode, can disconnect a first output node 206 from the input voltage VIN.

During the shutdown mode, the output voltage VOUT at the first output node 206 is OFF and no voltage is available for the application circuit 110. However, as seen in FIG. 4, the voltage regulator circuit 300 can include an alternate output path 302 coupled to a capacitor C2 for providing an output voltage to the application control circuit 112, e.g., a microcontroller. During the shutdown mode, the application control circuit 112 can be powered by the input voltage VIN at a second output node 304.

As soon as the application circuit 110 powers up after disabling the shutdown mode, the application control circuit 112 can be run. However, the application circuit 110 and the application control circuit 112 can then be at different voltage levels and level shifting may be needed.

Figure 5:
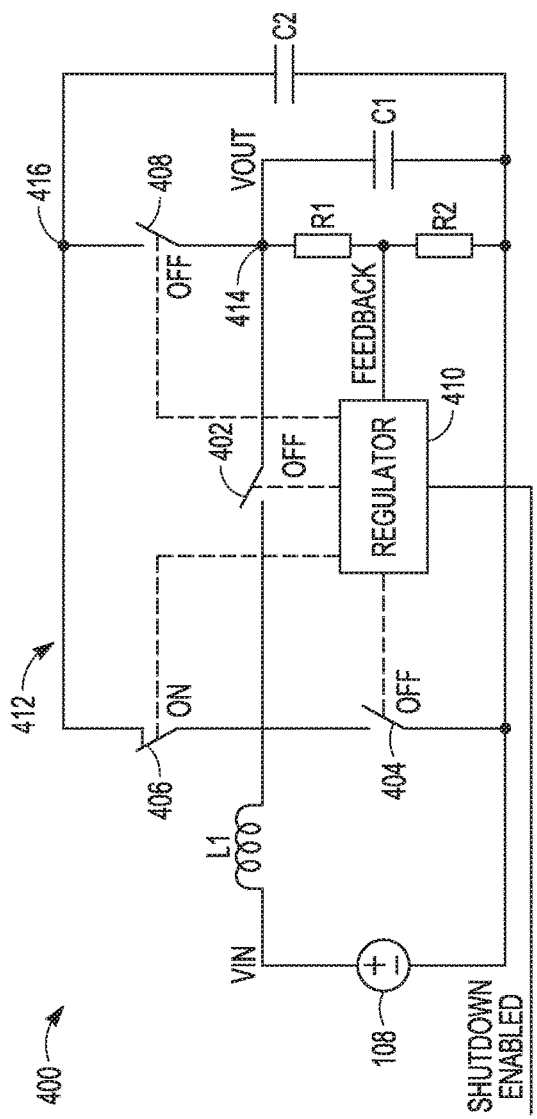
FIG. 5 is an example of a voltage regulator circuit in a shutdown enabled mode that can implement various techniques of this disclosure.

FIG. 5 is an example of a voltage regulator circuit 400 in a shutdown enabled mode that can implement various techniques of this disclosure. The voltage regulator circuit 400 of FIG. 5 can include electronic switches 402-408 that are each coupled to and controlled by a regulator control circuit 410. At least some of the switches 402-408 can include transistors, such as field-effect transistors (FET), for example. In some examples, the switches 406, 408 can be implemented as diodes, e.g., a diode-connected FETs.

An inductor L1 can be coupled to an input voltage VIN, such as provided by a voltage source 108, such as a battery, and to a capacitor C1 via the switch 402. The regulator control circuit 410 can control the transistors 402, 404 to turn ON and OFF to control the alternating charging of the inductor L1 and the capacitor C1. A load (not depicted) can be coupled in parallel with the capacitor C1 and supplied with an output voltage VOUT.

As seen in FIG. 5, the voltage regulator circuit 400 can include an alternate output path 412 including a capacitor C2 for providing an output voltage to an application control circuit, e.g., a microcontroller, for example. In addition, the voltage regulator circuit 400 can include a feedback path between a first output node 414 and the regulator control circuit 410 via the feedback resistors R1, R2.

The voltage regulator circuit 400 of FIG. 5 is shown in a shutdown mode after a control circuit has provided a "shutdown enabled" signal to the regulator control circuit 410. In the shutdown enabled mode, the regulator control circuit 410 can open switches 402, 404, and 408 and close the switch 408. With switch 402 open during the shutdown mode, the regulator control circuit 410 can disconnect the first output node 414 from the input voltage VIN. During the shutdown mode, the regulator control circuit 410 can stop generating the first output voltage at the first output node 414, and no voltage is available for any connected loads (not shown).

Figure 6:
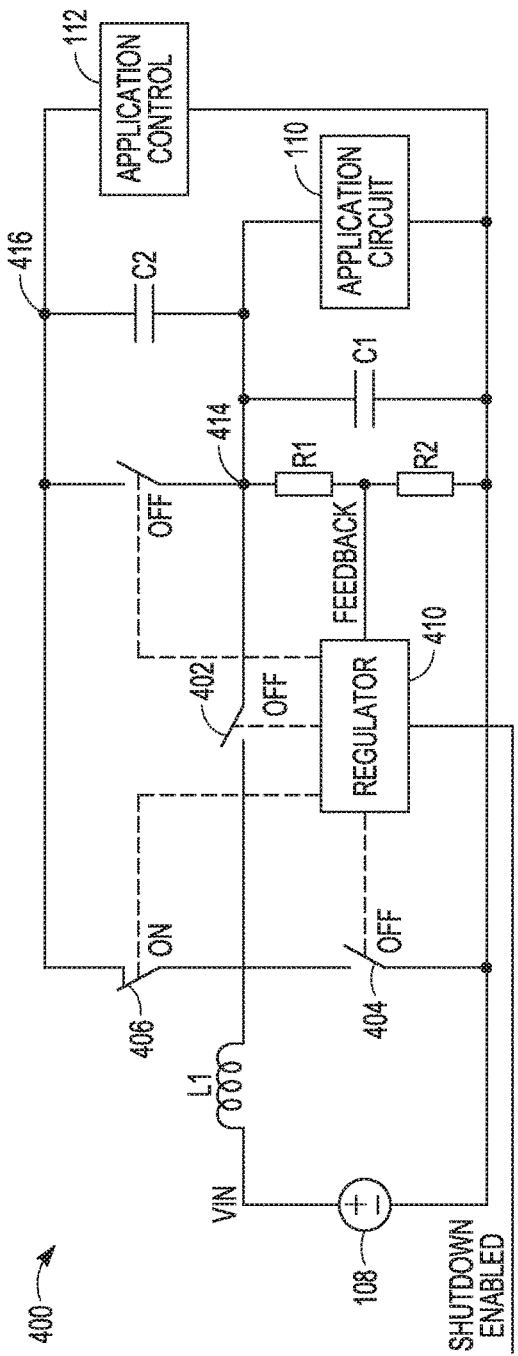
FIG. 6 is the voltage regulator circuit in FIG. 5 coupled to a load.

However, in accordance with this disclosure, the regulator control circuit 410 can control the switch 406 to close in order to couple the input voltage VIN, such as supplied by a battery, to a second output node 416 and provide a second output voltage different from the first output voltage to the second output node. For example, an output voltage approximately equal to VIN, e.g., 3V, can be provided to the second output node 416, rather than a regulated output voltage, e.g., 5V, that would be supplied to the first output node 414 during normal operation. In this manner, when the shutdown mode has been enabled, the input voltage VIN can be connected through the closed switch 406 to, for example, an application control circuit, such as shown in FIG. 6. In addition, by opening the switches 402, 404, and 408, the first output node 414 can be disconnected from the input, and there is no path through the feedback resistors R1, R2, which can save power.

In FIG. 5, the switch 406 is shown as coupled after the inductor L1. However, in some examples, the switch 406 can be coupled between the input voltage source 108 and the inductor L1.

In some examples, the voltage regulator circuit of FIG. 5 can include a DC-DC boost converter circuit.

FIG. 6 is the voltage regulator circuit 400 in FIG. 5 coupled to a load. As seen in FIG. 6, in the shutdown enabled mode, the regulator control circuit 410 can control switch 402 to open, which can disconnect the first output node 414 from the input voltage VIN. In this condition, there is no power to the application circuit 110. However, the regulator control circuit 410 can control the switch 406 to close in order to connect the input voltage VIN to the second output node 416 and supply power to the application control circuit 112, for example.

During the shutdown enabled mode, the regulator control circuit 410 can be configured to stop generating a first output voltage, e.g., a regulated output voltage of 5V, at the first output node 414 and couple the input voltage, e.g., a 3V input voltage, to the second output node 416 and provide a second output voltage, e.g., approximately equal to the 3V input voltage, different from the first output voltage, e.g., the regulated output voltage of 5V, to the second output node 416.

The voltage regulator circuit 400 can include a second feedback path 418 between the regulator control circuit 410 and the second output node 416 via the feedback resistors R1, R2. During the shutdown enabled mode, the regulator control circuit 400 can receive the "shutdown enabled" signal to place the regulator control circuit 410 in standby mode. In response, the regulator control circuit 410 can open the switch 408 in the second feedback path 418, thereby disconnecting the second feedback path 418, which can prevent current flow through the feedback resistors R1, R2 and thus eliminate power loss.

Figure 7:
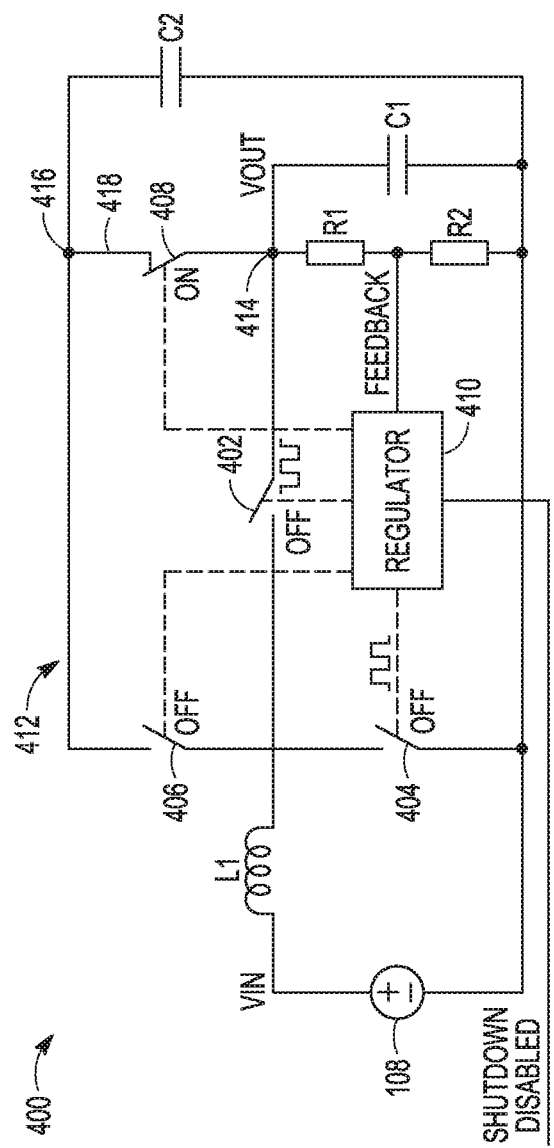
FIG. 7 is the voltage regulator circuit of FIG. 5 in a shutdown disabled mode.

FIG. 7 is the voltage regulator circuit 400 of FIG. 5 in a shutdown disabled mode. During the shutdown disabled mode, e.g., a normal operation mode, the regulator control circuit 410 receives the "shutdown disabled" signal to place the regulator control circuit 410 in a normal operating mode. To resume generating the first output voltage, e.g., the regulated voltage, at the first output node 414, the regulator control circuit 410 can alternatingly control the opening and closing of the switches 402, 402.

In addition, the regulator control circuit 410 can control the switch 408 to close to connect the second output node 416, via the second feedback path 418 and the feedback resistors R1, R2, to the regulator control circuit 410. Closing the switch 408 can couple the output voltage VOUT, e.g., the regulated output voltage, to both the first output node 414 and the second output node 416. Finally, the regulator control circuit 410 can control the switch 406 to open in order to decouple the input voltage VIN from the second output node 416.

In this manner, the application control circuit 112 of FIG. 6, such as a microcontroller, can be powered from the first output node 414 while the output voltage regulated system is running. This can eliminate the need for level shifting, such as in the configuration shown in FIG. 4.

Figure 8:
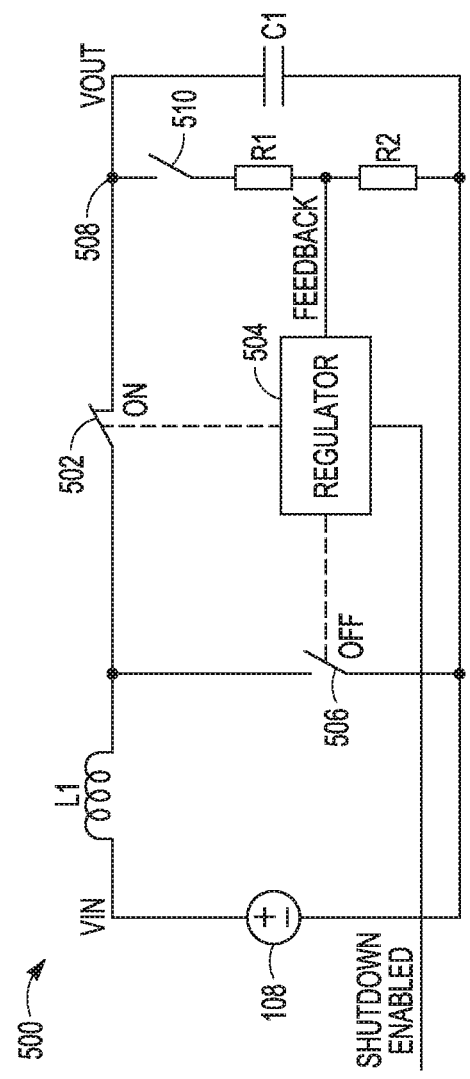
FIG. 8 is another example of a voltage regulator circuit in a shutdown enabled mode that can implement various techniques of this disclosure.

FIG. 8 is another example of a voltage regulator circuit 500 in a shutdown enabled mode that can implement various techniques of this disclosure. An inductor L1 can be coupled to an input voltage VIN, such as provided by a voltage source, such as a battery, and to a capacitor C1 via the first electronic switch 502. During the shutdown enabled mode, the regulator control circuit 504 receives the "shutdown enabled" signal to place the regulator control circuit 504 in a standby mode.

In the shutdown mode, the regulator control circuit 504 can open the switch 506 and close the switch 502. In this manner, an output voltage VOUT can still be provided by the voltage source 108, such as a battery, to the first output node 508. An application control circuit, such as the application control circuit 112 of FIG. 9, e.g., a microcontroller, can still be powered from the input voltage VIN while the regulator is mainly disconnected, except for its standby logic.

In addition, the voltage regulator circuit 500 of FIG. 8 can include a switch 510 in the feedback path formed between the first output node 508 and the regulator control circuit 504 via the resistors R1, R2. In the shutdown mode, the regulator control circuit 504 can open the switch 510 to disconnect the regulator control circuit 504 from current leakage in the feedback path, which can reduce power loss.

In some examples, the voltage regulator circuit of FIG. 5 can include a DC-DC boost converter circuit.

Figure 9:
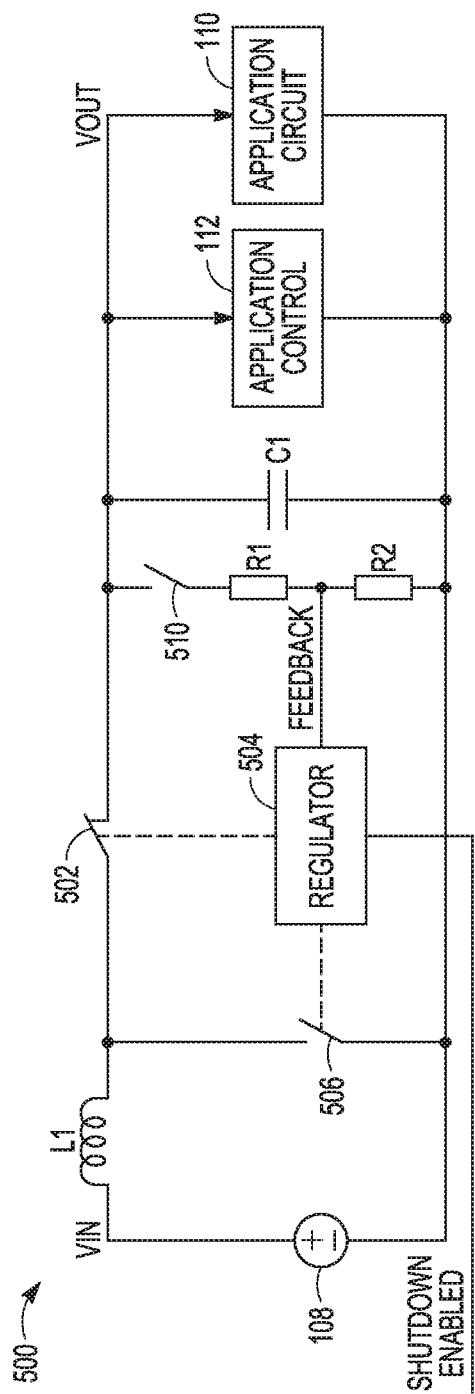
FIG. 9 is the voltage regulator circuit in FIG. 8 coupled to a load.

FIG. 9 is an example of the voltage regulator circuit 500 in FIG. 8 coupled to a load. The output node 508 is coupled to an application control circuit 112 and an application circuit 110. In the shutdown mode shown in FIG. 9, the regulator control circuit 504 can open switch 506 and, to disconnect the feedback path between the regulator control circuit 504 and the output node 508, the regulator control circuit can open the switch 510.

During the shutdown enabled mode, the regulator control circuit 504 is configured to stop generating the output voltage at the output node 508 and couple the input voltage VIN to the output node 508. To provide power to the output node 508, the regulator control circuit 504 can close the switch 502, which provides a second output voltage, e.g., approximately VIN, such as 3V, different from a first output voltage, e.g., a regulated output voltage, such as 5V, to the output node 508.

In this manner, the application control circuit 112 and the application circuit 110 can be powered by the voltage source, such as a battery, during the shutdown mode. Thus, an input voltage can be provided to the output, such as to power medical device circuitry, while disconnecting various components of the voltage regulator circuit 500. Like the voltage regulator circuit 400 of FIG. 6, the voltage regulator circuit 500 of FIG. 9 can avoid level shifting issues.

The voltage regulator circuit 400 shown in FIG. 6 utilized two output nodes 414, 416. In contrast, the voltage regulator circuit 500 of FIG. 9 utilizes a single output node 508.

Figure 10:
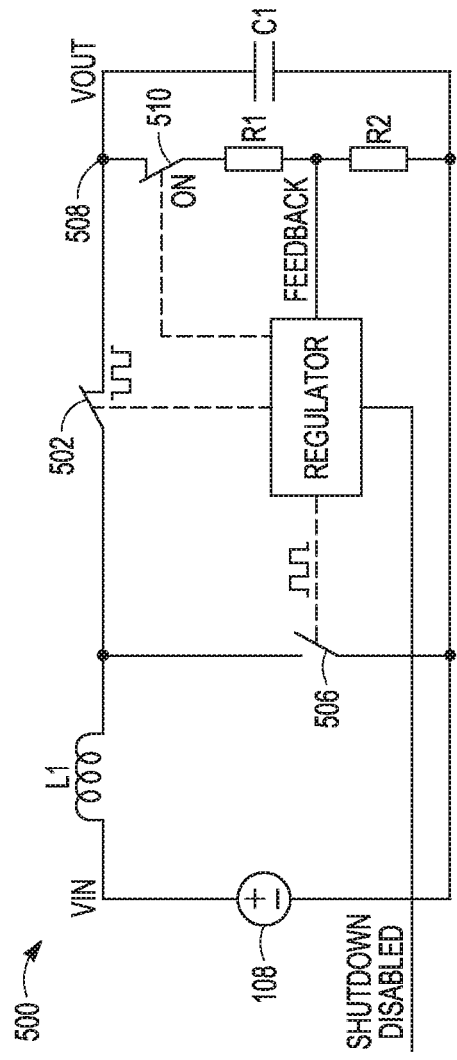
FIG. 10 is the voltage regulator circuit of FIG. 8 in a shutdown disabled mode.

FIG. 10 is the voltage regulator circuit 500 of FIG. 8 in a shutdown disabled mode. During the shutdown disabled mode, the regulator control circuit 504 receives the "shutdown disabled" signal to place the regulator control circuit 504 in a normal operating mode. To resume generating the first output voltage at the output node 508, the regulator control circuit 504 can alternatingly control the opening and closing of the switches 502, 506. In addition, the regulator control circuit 504 can control the switch 510 to close to connect the output node 508, via the feedback path through the feedback resistors R1, R2, to the regulator control circuit 504.

In this manner, the application control circuit 112 and the application circuit 110 of FIG. 9 can be powered from the first output node while the output voltage regulated system is running. This can eliminate the need for level shifting, such as in the configuration shown in FIG. 4, while controlling running.

NOTES

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A voltage regulator circuit configured to receive an input voltage and generate a first output voltage, the voltage regulator circuit having a shutdown enabled mode, the voltage regulator circuit comprising:
   a regulator control circuit configured to control a plurality of switches to generate the first output voltage at a first output node; and
   a first feedback path between the regulator control circuit and the first output node, wherein the first feedback path includes a first switch of the plurality of switches, and wherein, during the shutdown enabled mode, the regulator control circuit is configured to open the first switch to disconnect the first feedback path,
   wherein, during the shutdown enabled mode, the regulator control circuit is configured to stop generating the first output voltage and couple the input voltage to a second output node and provide a second output voltage different from the first output voltage to the second output node.

2. The voltage regulator circuit of claim 1, wherein the second output node is the same as the first output node.

3. The voltage regulator circuit of claim 1, wherein during a shutdown disabled mode, the regulator control circuit is configured to:

resume generating the first output voltage; and
control the first switch to close to connect the first feedback path.

4. The voltage regulator circuit of claim 1, comprising:
a second feedback path between the regulator control circuit and the second output node, wherein the second feedback path includes a second switch of the plurality of switches, and wherein, during the shutdown enabled mode, the regulator control circuit is configured to open the second switch to disconnect the second feedback path.

5. The voltage regulator circuit of claim 4, wherein during a shutdown disabled mode, the regulator control circuit is configured to:
resume generating the first output voltage;
control the second switch to close to connect the second feedback path; and
control a third switch to open to decouple the input voltage from the second output node.

6. The voltage regulator circuit of claim 5, wherein, during the shutdown disabled mode, the regulator control circuit is configured to couple the first output voltage to both the first output node and the second output node.

7. The voltage regulator circuit of claim 1, comprising:
an inductor coupled to the input voltage,
wherein, during the shutdown enabled mode, the regulator control circuit is configured to control a fourth switch to close to couple the input voltage to the second output node and provide the second output voltage different from the first output voltage to the second output node, and
wherein the fourth switch is coupled between the inductor and the second output node.

8. The voltage regulator circuit of claim 1, comprising:
an inductor coupled to the input voltage,
wherein, during the shutdown enabled mode, the regulator control circuit is configured to control a fourth switch to close to couple the input voltage to the second output node and provide the second output voltage different from the first output voltage to the second output node, and
wherein the fourth switch is coupled between the input voltage and the inductor.

9. The voltage regulator circuit of claim 1, wherein the voltage regulator circuit includes a DC-DC boost converter circuit.

10. A method of operating a voltage regulator circuit having a shutdown enabled mode and including a plurality of switches, wherein the voltage regulator circuit includes a first feedback path between the regulator control circuit and the first output node, wherein the first feedback path includes a first switch of the plurality of switches, the method comprising:
receive an input voltage and control a plurality of switches to generate a first output voltage at a first output node;
during a shutdown enabled mode, stopping the generation of the first output voltage; and
coupling the input voltage to a second output node and providing a second output voltage different from the first output voltage to the second output node; and
during the shutdown enabled mode, opening the first switch to disconnect the first feedback path.

11. The method of claim 10, wherein the second output node is the same as the first output node.

12. The method of claim 10, comprising:
during a shutdown disabled mode:
resuming the generation of the first output voltage; and
controlling the first switch to close to connect the first feedback path.

13. The method of claim 10, wherein the voltage regulator circuit includes a second feedback path between the regulator control circuit and the second output node, wherein the second feedback path includes a second switch of the plurality of switches, the method comprising:
during the shutdown enabled mode, opening the second switch to disconnect the second feedback path.

14. The method of claim 13, comprising:
during a shutdown disabled mode:
resuming the generation of the first output voltage;
controlling the second switch to close to connect the second feedback path; and
controlling a third switch to open to decouple the input voltage from the second output node.

15. The method of claim 14, comprising:
during the shutdown disabled mode, coupling the first output voltage to both the first output node and the second output node.

16. A voltage regulator circuit configured to receive an input voltage and generate a first output voltage at a first output node, the voltage regulator circuit having a shutdown enabled mode and a first feedback path between a regulator control circuit and the first output node, the voltage regulator circuit comprising:
means for controlling a plurality of switches to generate a first output voltage at a first output node;
during a shutdown enabled mode, means for stopping the generation of the first output voltage;
means for coupling the input voltage to a second output node and means for providing a second output voltage different from the first output voltage to the second output node; and
means for disconnecting the first feedback path during the shutdown enabled mode.

17. The voltage regulator circuit of claim 16, wherein the voltage regulator circuit includes a shutdown disabled mode, the regulator control circuit comprising:
means for resuming the generation of the first output voltage; and
means for connecting the first feedback path.

18. The voltage regulator circuit of claim 17, wherein during the shutdown disabled mode, the regulator control circuit is configured to couple the first output voltage to both the first output node and the second output node.

19. The voltage regulator circuit of claim 16, wherein the voltage regulator circuit includes a DC-DC boost converter circuit.

* * * * *